United States Patent [19]

Eastwood

[11] Patent Number: 4,707,194
[45] Date of Patent: Nov. 17, 1987

[54] PROCESS FOR THE PRODUCTION OF BEARING MATERIALS

[75] Inventor: Barry J. Eastwood, Aylesbury, England

[73] Assignee: AE PLC, Rugby, England

[21] Appl. No.: 863,711

[22] Filed: May 16, 1986

[30] Foreign Application Priority Data

May 28, 1985 [GB] United Kingdom ................. 8513330

[51] Int. Cl.$^4$ ................................................ C22F 1/04
[52] U.S. Cl. .......................... 148/11.5 A; 148/11.5 Q; 148/127
[58] Field of Search ...................... 148/3, 127, 11.5 A, 148/11.5 Q, 438; 420/530

[56] References Cited

U.S. PATENT DOCUMENTS 2,473,060 6/1949 Hunsicker et al. .................. 420/530
4,471,033 9/1984 Fukuoka et al. ..................... 148/415

FOREIGN PATENT DOCUMENTS 0131428 1/1985 European Pat. Off. .
1515757 1/1968 France .
1069143 5/1967 United Kingdom .
2067219 7/1981 United Kingdom .
2144149 2/1985 United Kingdom .

Primary Examiner—R. Dean
Attorney, Agent, or Firm—William R. Hinds

[57] ABSTRACT

Bearing materials and a process for the manufacture thereof are described. The bearing alloys are aluminium-based and comprise the following compositions expressed in weight percent; 8 to 35 tin, 1 to 3 copper, 2 to 10 silicon and remainder aluminium apart from incidental impurities. The alloys are preferably bonded to steel. The composite material is then raised in temperatrue preferably within the range 450° to 500° C. for a total time between 10 minutes and 90 seconds and then cooled at a cooling rate of at least 50° C./min. for at least part of the temperature drop to ambient temperature. The composite material may optionally be additionally heat-treated thereafter to further improve the properties.

11 Claims, No Drawings

PROCESS FOR THE PRODUCTION OF BEARING MATERIALS

The present invention relates to bearing materials and processes for the manufacture thereof and particularly to aluminium-based bearing materials having alloying additions including copper, silicon and a relatively soft phase such as tin, for example.

A bearing material based on aluminium and comprising approximately 20 wt % Sn and 1 wt % Cu is well-known and widely used in, for example, the automotive industry in plain journal bearing applications. Whilst the fatigue resistance and compatibility i.e. the ability to resist local welding between the bearing alloy and rotating shaft, of this material is entirely adequate in most applications there have been fatigue problems when using such material in highly rated engines. Furthermore, the compatibility of such materials when used in conjunction with cast-iron shafts is somewhat less than desirable. Generally the surface finishes attainable on the journals of cast-iron shafts are inferior to those attainable on steel shafts. The result of this is that cast-iron shafts tend to be more abrasive than steel shafts.

Another well-known aluminium-based material having a higher fatigue strength than Al-Sn20-Cu1 is Al-Si11-Cu1. Ths silicon is usually present as a uniform distribution of particles throughout the matrix. Whilst the fatigue strength of this material is high, due to the relatively hard nature of the matrix, its conformability is relatively poor. To overcome the problem of conformability that is, the ability of the bearing alloy to accommodate small misalignments between itself and a rotating shaft, this latter material is often operated with an electrodeposited overlay of, for example, Pb-Sn10 with an interlayer of nickel between the overlay and the bearing alloy. The soft overlay provides both conformability and dirt embeddability.

Dirt embeddability is becoming increasingly important as diesel engines are tending more and more to be operated on less refined fuels. The debris emanating from less refined diesel fuels produces both erosion and corrosion of soft overlays which result in a shortened operating life. Furthermore, where the overlay is worn away and large areas of nickel interlayer are exposed there is some evidence to suggest that the risk of bearing seizure increases.

The rate of overlay wear is further increased in automotive engines which have cast-iron shafts.

Extensive research has shown that improved fatigue strength and improved conformability and compatibility with cast iron shafts may be obtained by the incorporation of silicon into an aluminium-based bearing material whilst still retaining a soft phase within the matrix. My co-pending patent application GB No. 2,144,149 describes aluminium-based bearing materials having inter alia 8 to 35 wt % tin, 1 to 11 wt % silicon and 0.2 to 3 wt % copper. These materials possess fatigue strength and compatibility against a cast-iron shaft superior to Al-Sn20-Cu1 and conformability superior to unplated Al-Si11-Cu1. The fatigue strength of these alloys, however, is not as high as the latter material.

A further problem with the Al-Si11-Cu1 material additional to the need to overlay plate and which also leads to a more expensive production route is the need to turn or otherwise machine the final bearing surface to be plated as distinct from the cheaper alternative of bore broaching.

It is an object of the present invention to provide a bearing material having greatly improved fatigue strength and improved compatibility over Al-Sn20-Cu1 against cast-iron shafts. It is a further object to provide a bearing material having fatigue strength in unplated form comparable to that of Al-Si11-Cu1 whilst being able to be bore broached to finish size.

It has now been unexpectedly discovered that alloys lying within the ranges disclosed in GB No. 2,144,149 may, by suitable thermal processing, achieve the desired objects stated above. Furthermore, by adjusting the thermal processing within defined limits the properties of the resulting bearing material may be controlled to suit specific applications.

I have found that a process for the production of a bearing material, generally applicable to the material in monolithic form, having a composition lying within the following ranges expressed in weight per cent; 8 to 35 tin, 1 to 3 copper, 2 to 10 silicon and remainder aluminium apart from incidental impurities may comprise the steps of casting the desired alloy in suitable form, raising the temperature of the alloy to a temperature in excess of 400° C. but less than 525° C. and subsequently cooling the alloy at a cooling rate of at least 50° C./min. for at least part of the temperature drop to ambient temperature.

Preferably the tin content may lie within one of the two ranges from 9 to 13 wt % and from 15 to 25 wt % and similarly the copper content preferably lies within the range 1.5 to 2.5 wt %. Where the tin content lies within the range 9 to 13 wt % the silicon content may preferably lie within the range 3 to 5 wt %. Where, however, the tin content lies within the range 15 to 25 wt % the silicon content may preferably lie within the range 2 to 4 wt %.

Preferably the alloy is cooled at a cooling rate of at least 50° C./min. to a temperature below 200° C. whereupon the cooling rate may be altered if desired.

The process given above is generally applicable to alloy in monolithic form. The alloy, however, is most advantageous when used for bearing material in bimetal form i.e. where the bearing alloy is bonded to a strong backing material such as steel, for example, and used to produce so-called thin-walled bearings.

Aluminium-based alloy bonded to a backing material such as steel is generally produced by a continuous or semi-continuous production process wherein large coils of the bimetal material are produced for further processing eventually into individual bearings.

One consideration which is of paramount importance when the thermal treatment of aluminium-based alloys bonded to ferrous substrates is undertaken is that of the possible formation of intermetallic compounds at or near the interface between the aluminium and steel. The formation of such compounds may have a catastrophic effect on the durability of the bond between the bearing alloy and the steel and, moreover, this catastrophic effect may occur before any intermetallic compound formation becomes visible under the optical microscope.

It is essential, therefore, that any thermal treatment avoids the formation of intermetallic compounds of iron and aluminium whether visible under the optical microscope or otherwise. It has now been discovered that temperatures which heretofore were thought impractical with aluminium-based alloys bonded to steel because of such brittle intermetallic compound formation may in fact be utilised. This is providing that the rate of heating to that temperature is high and the dwell time at temperature is sufficiently short. Furthermore, it has also been discovered that the high heating rates and short times referred to above are able to bring into solution sufficient of the copper and silicon to allow the resulting bearing material to achieve the objectives of fatigue strength and broachability etc. of the invention.

According to an aspect of the present invention a process for the production of an aluminium-based bearing material having a steel backing and a composition lying within the following ranges expressed in weight percent; 8 to 35 tin, 1 to 3 copper, 2 to 10 silicon and remainder aluminium apart from incidental impurities comprises the steps of producing a desired alloy composition in suitable form, bonding the alloy to steel, raising the temperature of the bonded material to a temperature of at least 400° C. but less than 525° C. and wherein the aggregate time to heat to temperature and the dwell time at temperature lies within the range from 240 minutes to 60 seconds and subsequently cooling the bonded material at a cooling rate of at least 50° C./minute for at least part of the temperature drop to ambient temperature.

Preferably, the temperature to which the material is heated may lie in the range 425° C. to 500° C. and the time within the range from 120 seconds to 10 minutes. More preferably the temperature may lie in the range from 450° C. to 490° C.

In a preferred embodiment of the present invention the material may further include an interlayer of, for example, aluminium between the bearing alloy and the steel backing. Such an interlayer may be produced by cladding of the alloy billet by, for example, roll-pressure bonding prior to bonding to the steel backing.

It has been further discovered that an additional benefit of the inventive process is that the high temperatures and short times are sufficient to also produce reticulation of the tin phase within the worked structure and to fully consolidate the bond between the alloy and the steel. It is believed that the unexpectedly high performance of these bearing materials may possibly only be obtained with a reticular structure.

Thermal treatment of the bonded material according to the invention may, however, be carried out subsequent to other heat treatments known in the art, a typical example of which is heating at about 350° C. for around 3 hours. It will be appreciated by those skilled in the art that the opportunity to delete such long and expensive heat treatment stages may result in considerable economic savings in the production of bearing materials.

The time of the heating period may depend upon the temperature to which the material is raised. For example, where the eventual maximum temperature lies close to 450° C. the total aggregate heating time prior to cooling may be near to 10 minutes whereas if the maximum temperature attained lies close to 500° C. the total time may be closer to 120 seconds.

The post-heating cooling rate will have an effect on the properties of the alloy. For example, where the cooling rate is about 75° C./min. some of the copper and silicon will precipitate out of solution. Where the cooling rate is more rapid such as, for example, about 150° C. to 300° C./min more copper and silicon will be retained in solution.

It is envisaged that the thermal treatment of the bonded material may be accomplished on a continuous strip basis where the strip first passes through rapid heating means and subsequently through rapid cooling means. In order to make such a process economically viable it is necessary for the strip to travel at reasonable speeds. Therefore, relatively high temperatures for short times are more desirable. Although at 400° C. the alloy system is capable of taking into solution significant quantities of copper and silicon the reaction is slow and is difficult to accomplish as a continuous strip process. Whilst on a batch process basis it would be feasible to heat a coil of material at 425° C. for three or four hours, for example, it would be difficult to achieve the necessary cooling rate to retain in solution the copper and silicon without a form of quenching of the entire coil which process may be awkward and unweildy.

An optional additional heat treatment may be undertaken whereby the copper and silicon held in solution is precipitated out in a controlled manner. Such a heat treatment may involve a heat treatment period of, for example, between 1 and 72 hours desirably at a temperature above the anticipated operating temperature of the bearing. A suitable temperature may be between 150° C. and 230° C., for example, a more preferred temperature range, however, may lie between 180° C. and 220° C. and the corresponding times may lie in the range from 2 to 24 hours.

In order that the process of the present invention may be more fully understood some non-limiting examples will be described by way of illustration only.

EXAMPLE 1

An alloy having a composition Al-Sn11-Si4-Cu2 was continuously cast into billet form of 25 mm thickness. The billets were homogenisation annealed for 16 hours at 490° C. and then machined to a thickness of 19 mm. The billets were then rolled using several passes and a final annealing heat treatment to 7.6 mm thickness. The rolled strip was then clad on one side using roll-pressure bonding with 0.8 mm prepared aluminium foil. After cladding the strip was rolled down to 0.89 mm, the foil side cleaned and abraded and the strip roll-pressure bonded to prepared 2.5 mm thick steel strip. The resulting bimetal strip then possessed a steel backing having a thickness of 1.5 mm and the alloy/foil lining having a total thickness of 0.5 mm. The bearing alloy after roll-pressure bonding possessed a hardness of approximately 76 Hv.

The bimetal strip so produced was then heat-treated in an air circulating oven on a cycle which equated to 3 hours at 350° C. The bearing alloy hardness after such heat treatment was approximately 37 Hv.

The heat-treated bimetal strip was further heat-treated by rapidly heating in a fluidised bed to 475° C. for a total cycle time of 160 seconds. The bimetal strip took approximately 40 seconds to attain 420° C. and the remaining 120 seconds comprised the temperature rise from 420° to 475° C. and dwell at 475° C. The bimetal strip was then cooled at a cooling rate of approximately 150° C./minute. The hardness of the strip at this stage was approximately 47 Hv. From the strip produced test bearings of length 30 mm and diameter 53 mm were produced. Test bearings were also produced from the input strip i.e. strip prior to fluidised bed heat treatment.

The bearings so produced were fatigue tested on a test rig under the following conditions:
Shaft speed 2800 rev/min
Initial load 62 MPa
Load increased after 20 hours at each load by 7 MPa until failure Oil temperature 80° C.
Sinusoidal load pattern
The bearings were tested against Al-Sn20-Cu1 material for comparison. The results were as shown in Table 1.

TABLE 1

| Material Composition | No. of Tests. Failure at Indicated Load (MPa) 62 | 69 | 76 | 83 | 90 | 97 | 103 | 110 | 117 | 124 | 131 | Mean Fatigue Rating (MPa) |
|---|---|---|---|---|---|---|---|---|---|---|---|---|
| Al—Sn20—Cu1 | 1 | 2 | 6 | 6 | 4 | 4 | | | | | | 83 |
| Al—Sn11—Si4—Cu2 | 82 Si | | 1 | | 1 | 1 | 1 | | | | | 93 |
| Without fluidised bed treatment | | | | | | | | | | | | |
| Al—Sn11—Si4—Cu2 After fluidised bed treatment | | | | | | 2 | 4 | 2 | 5 | 5 | 2 | 114.5 |

Material was also made into bearings for seizure testing. The conditions of testing are given below.

1. The size of bearings used for fatigue testing were machined to half length to facilitate the use of higher specific loads than can normally be obtained.
2. The lubricating oil (SAE10) was preheated to 120° C.
3. The rig was run for 1 hour at 100 MPa.
4. The load was increased by 20 MPa and the rig run for 10 minutes at the new load. This procedure was repeated until seizure occurred or the back of the bearing temperature rose rapidly to about 160° C.

The load at which seizure occurred or the test terminated due to rapid temperature rise is the seizure rating.

The results are shown in Table 2. The test bearings were run against mild steel and cast iron shafts to evaluate compatibility and seizure-resistance for the different materials.

TABLE 2

| Material Composition | Shaft | Seizure at indicated loads (MPa). No. of tests. 100 | 120 | 140 | 160 | 180 | 200 | 220 | 240 | 260 |
|---|---|---|---|---|---|---|---|---|---|---|
| Al—Sn20—Cu1 | Mild steel | | | | | | | 2 | | 3 |
| Al—Sn20—Cu1 | Cast iron | 2 | | 2 | | 1 | | | | |
| Al—Sn11—Si4—Cu1 Untreated | Mild steel | | | | | | | | 2 | 4 |
| Al—Sn11—Si4—Cu1 Untreated | Cast iron | | | | | | | 1 | 1 | 1 |
| Al—Sn11—Si4—Cu2 Fluidised bed treated | Mild steel | | | | | | | | | 3 |
| Al—Sn11—Si4—Cu2 Fluidised bed treated | Cast iron | | | | | 2 | 2 | 1 | 1 | |

It should be noted in the above test results in Table 2 that 260 MPa represents the highest loading attainable with the particular test rig used and that of the three tests giving 260 MPa ratings for Al-Sn20-Cu1, one in fact did not seize and would have given a higher rating. Of the three tests giving 260 MPa ratings for the material made by the process of the present invention none of these bearings in fact seized and all three would have given higher ratings.

It is clear from Table 1 that the fatigue resistance of material made by the process of the present invention is clearly superior to both the Al-Sn20-Cu1 material and to the material of the type disclosed in GB No. 2,144,149 but which does not have the subsequent thermal treatment. It may be seen that the mean fatigue rating for Al-Sn20-Cu1 is approximately 83 MPa whereas the comparative fatigue rating for the Al-Sn11-Si4-Cu2 material is around 93 MPa before thermal treatment. After processing in accordance with the invention, however, the mean fatigue rating is improved to 114.5 MPa, an improvement in fatigue strength of 23% due to the process of the present invention.

From Table 2 it may be observed that the improvement in compatibility with cast iron shafts over Al-Sn20-Cu1 is maintained in the present alloys. The mean seizure rating of the Al-Sn20-Cu1 material is 132 MPa. The mean seizure rating of the inventive alloys is 203 MPa. Furthermore, the seizure performance of the inventive alloys is also superior when used in conjunction with a steel shaft.

Broaching tests were also carried out on bearings produced from the bimetal strip. Bearings were produced from strip having had the fluidised bed thermal treatment and strip prior to such thermal treatment. The tests comprised the removal of approximately 0.025 mm of alloy using a tungsten carbide cutter and a steel cutter for comparison and both having a 30° rake. Surface roughness measurements were taken on the broached bearings and the results are given in Table 3.

TABLE 3

| Cutter | Surface Roughness ($\mu mR_A$) Fluid bed treated | Untreated |
|---|---|---|
| Steel | 0.31–0.35 | 0.42–0.51 |
| Carbide | 0.27 | 0.32–0.89 |

It may be seen from Table 3 that material produced by the process of the invention has a finer more uniform finish than known alloys and moreover is capable of being broach finished as a production process. This is contrasted to Al-Si11-Cu1 which is not capable of being broach finished owing to its high matrix strength and lack of soft phase.

EXAMPLE 2

Alloy of the same composition was produced and processed into bimetal up to and including roll-pressure bonding of the alloy to the steel as in Example 1.

The bimetal so produced was then rapidly heated in a fluidised bed to 475° C. for a total time of 4 minutes after which it was cooled at a cooling rate of approximately 300° C./min On examination the bond between the steel and alloy was found to be free of inter-metallic formation and this was confirmed by testing which demonstrated a high integrity bond comparable to that of Example 1. The bearing alloy was also found to possess a fine reticular structure.

EXAMPLE 3

Alloy was produced and processed as in Example 2 except that the resulting bimetal was heated to 500° C. in a total time of 2 minutes. Again the alloy to steel interface was of high integrity and confirmed by bond testing and the structure was again reticular.

EXAMPLE 4

Samples of bimetal were produced as in Example 1 up to and including the stage of heat-treating in air for a cycle equating to 3 hours at 350° C. Pieces of bimetal were then heated to 450° C. over a cycle of 180 seconds and then water-spray quenched which gave a cooling rate in excess of 1000° C./min. The resulting alloy hardness was 52 Hv. Pieces of this material were then heat-treated at times ranging between 1 and 24 hours at 200° C. A maximum hardness of 60 Hv was achieved after about 16 hours.

EXAMPLE 5

Samples prepared as in Example 4 were taken and teat-treated for between 1 and 24 hours at 220° C. A maximum hardness of 58 Hv was achieved after about 6 hours and which gradually declined to 55 Hv after about 24 hours.

The rapid heating was undertaken in the Examples above by means of fluidised bed heating. Any means may, however, be used provided that the heating rate is sufficiently rapid. Alternative methods may include, for example, induction heating, high intensity radiant heating, plasma heating or any method known in the art. Cooling of the strip may be undertaken by gas impingement or any other method down to, for example, 200° C. and thereafter by conventional water cooling jackets around a muffle, other methods including, for example, fluidised bed cooling, liquid spray cooling, or passing the strip through a quench bath may be used.

The alloys of the present invention, therefore, provide substantial improvements in both fatigue and seizure resistance over known alloys which in some cases require expensive overlays. Furthermore, the alloys produced by the process of the invention may be broach finished. It is an optional step, however, to provide an overlay on bearings produced by the inventive process if it is so desired.

In some instances it may be desirable, however, to provide a bearing having increased conformability and yet higher fatigue strength, for example, in turbocharged engines or high speed diesels. In such applications the bearing alloy may be coated with an overlay chosen from the group including tin, lead/tin, lead/tin/copper, tin/copper, tin/antimony, tin/copper/antimony and lead/tin/copper/antimony. Furthermore, there may be interposed between the alloy lining and the overlay coating an interlayer chosen from the group including nickel, iron, silver, cobalt, copper, zinc and copper/tin.

Alternatively, bearings produced from alloy according to the present invention may be provided with an overlay of the type disclosed in co-pending European Patent Application No. 85309180.9 wherein the overlay comprises a thin layer of tin which is sacrificial in nature.

I claim:

1. A process for the production of an aluminium-based bearing material having a steel backing and a composition, expressed in weight percent, consisting essentially of 8 to 35 tin, 1 to 3 copper, 2 to 10 silicon and remainder aluminium apart from incidental impurities comprising the steps of producing a desired alloy composition in suitable form, bonding the alloy to steel backing, raising the temperature of the bonded material to a temperature of at least 400° C. but less than 525° C. and wherein the aggregate time to heat to temperature and the dwell time at temperature lies within the range from 240 minutes to 60 seconds and subsequently cooling said bonded material at a cooling rate of at least 50° C./minute for at least part of the temperature drop to ambient temperature.

2. A process according to claim 1 and wherein said aluminum-based bearing alloy consists essentially of tin 9 to 13 wt %, copper 1.5 to 2.5 wt %, silicon 3 to 5 wt %, balance aluminium apart from incidental impurities.

3. A process according to claim 1 and wherein said aluminium-based bearing alloy consists essentially of tin 15 to 25 wt %, copper 1.5 to 2.5 wt %, silicon 2 to 4 wt%, balance aluminium apart from incidental impurities.

4. A process according to claim 1 and wherein said bonded material is raised to a temperature of between 450° and 500° C. for an aggregate time of 10 minutes to 90 seconds depending upon the temperature.

5. A process according to claim 1 and wherein said material is cooled to a temperature of below 200° C. at a cooling rate of at least 50° C./min.

6. A process according to claim 1 and wherein the cooling rate is at least 300° C./min.

7. A process according to claim 1 and wherein said bonded material is heat treated at a temperature of approximately 350° C. for an extended period prior to having its temperature raised to between 400° and 525° C.

8. A process according to claim 1 and wherein said bonded material is further heat treated at a temperature of between 150° C. and 230° C. for times between 72 hours and one hour.

9. A process according to claim 1 and wherein said bonded material is raised to temperature by a fluidised bed.

10. A process according to claim 1 and wherein the finished bearing material has an overlay coating thereon.

11. A process according to claim 1 wherein an interlayer is included between the bearing material and the steel backing.

* * * * *